(12) United States Patent
Okano et al.

(10) Patent No.: US 6,749,530 B2
(45) Date of Patent: Jun. 15, 2004

(54) BELT-TYPE CONTINUOUSLY VARIABLE TRANSMISSION

(75) Inventors: Takemasa Okano, Saitama (JP); Toshihiro Saito, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 131 days.

(21) Appl. No.: 10/105,157

(22) Filed: Mar. 26, 2002

(65) Prior Publication Data

US 2002/0142870 A1 Oct. 3, 2002

(30) Foreign Application Priority Data

Mar. 30, 2001 (JP) ........................... 2001-101276

(51) Int. Cl.[7] ........................... F16H 55/56; F16H 61/02
(52) U.S. Cl. ................. 474/28; 474/12; 474/8; 474/70
(58) Field of Search .............. 474/18, 8, 28, 474/11, 12; 477/45–49, 33; 475/210

(56) References Cited

U.S. PATENT DOCUMENTS

| 4,663,991 A | * | 5/1987 | Nakamura et al. ............ 474/28 |
| 4,973,288 A | * | 11/1990 | Sakakibara et al. ............ 474/8 |
| 5,427,579 A | * | 6/1995 | Kanehara et al. ............ 474/28 |
| 5,643,116 A | * | 7/1997 | Genzel et al. ............ 474/18 |
| 5,776,028 A | * | 7/1998 | Matsuda et al. ............ 477/45 |
| 5,871,411 A | * | 2/1999 | Senger et al. ............ 474/11 |
| 6,524,210 B1 | * | 2/2003 | Vorndran ............ 474/28 |

FOREIGN PATENT DOCUMENTS

| JP | 61-82060 | 4/1986 |
| JP | 63-106454 | 5/1988 |

* cited by examiner

*Primary Examiner*—Marcus Charles
(74) *Attorney, Agent, or Firm*—Westerman, Hattori Daniels & Adrian, LLP

(57) ABSTRACT

The rigidity of a movable pulley half is enhanced by the rigidity of a cylinder fixed to a back surface of the movable pulley half and influences of a controlled hydraulic pressure and a centrifugal hydraulic pressure which are exerted in a hydraulic fluid chamber partitioned in the cylinder. On the other hand, an annular protruding portion having detection teeth for a rotation sensor is formed on a back surface of an outer circumferential portion of a fixed pulley half, whereby the difference in rigidity between both the pulley halves is reduced by the effect of the annular protruding portion to improve the rigidity of the fixed pulley half, thereby making it possible to allow the variation characteristics of a misalignment relative to a drive ration to approach a characteristic set in advance.

6 Claims, 5 Drawing Sheets

FIG. 7

BELT-TYPE CONTINUOUSLY VARIABLE TRANSMISSION

BACKGROUND OF THE INVENTION

1. Field of the Invention

The present invention relates to a belt-type continuously variable transmission in which a metal belt is wound around a drive pulley and a driven pulley which are both variable in groove width.

2. Description of the Related Art

Figure 7:
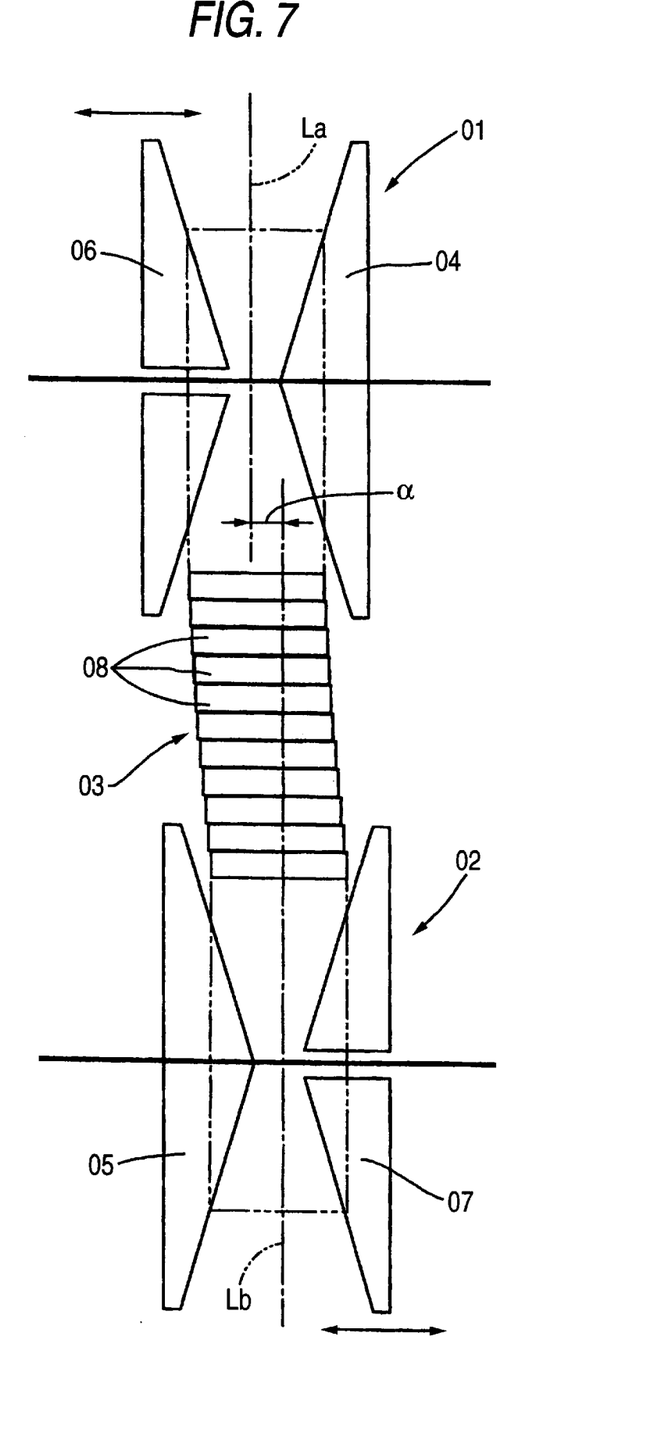
FIG. 7 is an explanatory view of a misalignment of the belt-type continuously variable transmission.

In a belt-type continuously variable transmission as shown in FIG. 7, a metal belt 03 is wound around a drive pulley 01 and a driven pulley 02. A fixed pulley half 04 of the drive pulley 01 and a fixed pulley half 05 of the driven pulley 02 are disposed at diagonal positions, whereas a movable pulley half 06 of the drive pulley 01 and a movable pulley half 07 of the driven pulley 02 are disposed at diagonal positions. Consequently, when the movable pulley halves 06, 07 of the drive pulley 01 and the driven pulley 02 move closer to and apart from the fixed pulley halves 04, 05, a center line La of a V-groove in the drive pulley 01 and a center line Lb of a V-groove in the driven pulley 02 come to be out of alignment with each other, producing a slight misalignment α.

Known through JP-A-61-82060 and JP-A-63-106454 are belt-type continuously variable transmissions in which the drive ratio at which the misalignment between a drive pulley and a driven pulley is removed is determined from view points of the performance and efficiency of a vehicle.

Incidentally, the movable pulley half is hydraulically biased toward the fixed pulley half in such a manner that the metal belt is prevented from slipping, and therefore both the pulley halves are deformed in such a manner as to deflect axially outwardly with a reaction force exerted by the metal belt. As this occurs, in the event that the rigidity of both the pulley halves is identical, the amount of deformation thereof becomes uniform, and therefore there is no case where the magnitude of misalignment varies due to the deformation. However, in fact, since there exists a difference in rigidity between the movable pulley half and the fixed pulley half, the amount of deformation of both the pulley halves become uneven, affecting the magnitude of misalignment. In general, a cylinder is integrally formed on a back of the movable pulley half to partition a hydraulic fluid chamber thereat. Moreover, since not only a controlled hydraulic pressure for biasing the movable pulley half toward the fixed pulley half but also a centrifugal pressure generated in conjunction with the rotation of the pulley are exerted on the hydraulic fluid chamber, the rigidity of the movable pulley half becomes higher than the rigidity of the fixed pulley half.

Figure 6A:
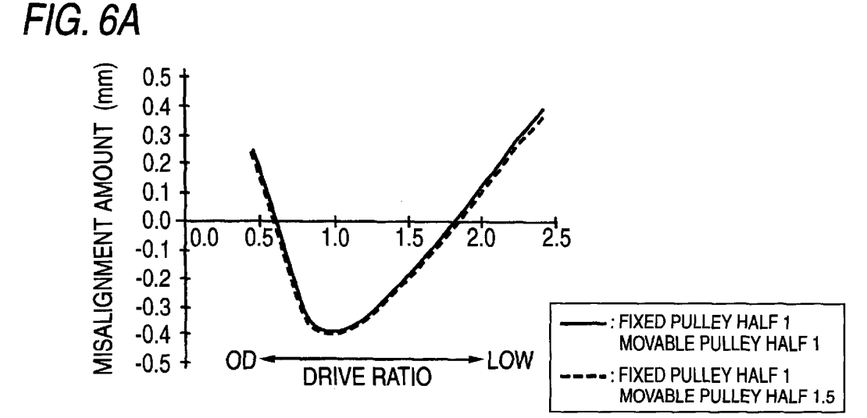
FIGS. 6A to 6C are graphs showing relationships between drive ratios and misalignments.
Figure 6B:
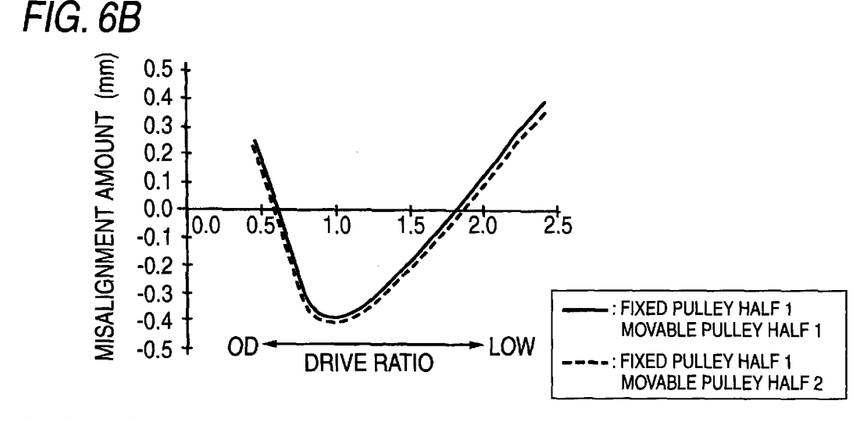
Figure 6C:
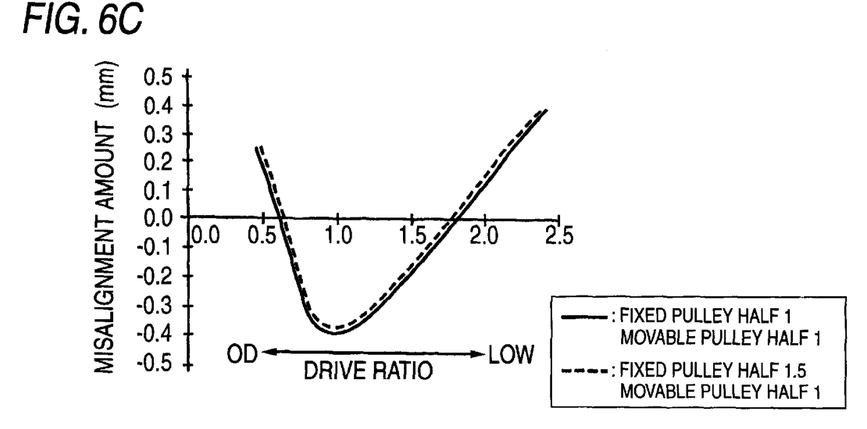

Solid lines illustrated in FIGS. 6A to 6C indicate the variation of the misalignment relative to the change in drive ratio when the rigidity ratio of the fixed pulley half and the movable pulley half is 1 to 1. The amount of misalignment decreases from a positive value as the drive ratio increases and passes through zero to become a negative value. Thereafter, the misalignment amount increases and passes through zero again to become a positive value. The maximum and minimum values of the amount of misalignment are set such that absolute values (about 0.4 mm) thereof become substantially equal to each other.

A broken line in FIG. 6A shows a characteristic resulting when the rigidity ratio of the fixed pulley half and the movable pulley half is 1 to 1.5, and the characteristic is deviated downwardly when compared with a characteristic (refer to the solid line) resulting when the rigidity ratio is 1 to 1. A broken line in FIG. 6B shows a characteristic resulting when the rigidity ratio of the fixed pulley half and the movable pulley half is 1 to 2, and the characteristic is deviated further downwardly when compared with a characteristic (refer to the solid line) resulting when the rigidity ratio is 1 to 1. A broken line in FIG. 6C, which is shown by reference, shows a characteristic resulting when the rigidity ratio of the fixed pulley half and the movable pulley half is 1.5 to 1, and the characteristic is deviated upwardly when compared with a characteristic (refer to the solid line) resulting when the rigidity ratio is 1 to 1.

SUMMARY OF THE INVENTION

The invention was made in view of these situations and an object thereof is to make the variation characteristics of misalignment approach a characteristic set in advance by reducing the difference in rigidity between fixed pulley halves and movable pulley halves of a belt-type continuously variable transmission.

With a view to attaining the object, according to a first aspect of the invention, there is provided a belt-type continuously variable transmission comprising a drive pulley comprising in turn a fixed pulley half and a movable pulley half adapted to move closer to and apart from the fixed pulley half and supported on an input shaft, a driven pulley comprising a fixed pulley half and a movable pulley half adapted to move closer to and apart from the fixed pulley half and supported on an output shaft, and a metal belt extended to be wound around the drive pulley and the driven pulley, wherein both the fixed pulley halves and both the movable pulley halves are disposed at diagonal positions, respectively, wherein hydraulic fluid chambers are formed in both the movable pulley halves, and wherein a number of detection teeth for a rotation sensor are formed in radial directions on a back of an outer circumferential portion of at least one of both the fixed pulley halves. The detection teeth for the rotation sensor are formed in an annular protruding portion provided on the back of the outer circumferential portion of the at least one of he fixed pulley halves.

According to the above construction, since the annular protruding portion is formed on the back of the protruding portion of at least one of the drive pulley and the driven pulley of the belt-type continuously variable transmission and the detection teeth for the rotational sensor are formed in the protruding portion, the annular protruding portion can be made to contribute effectively to the enhancement of rigidity of the fixed pulley half. Then, since the difference in rigidity between the fixed pulley half and the movable pulley half whose rigidity is increased by the provision of the hydraulic fluid chamber can be reduced by the enhancement of rigidity of the fixed pulley half, the variation characteristics of misalignment relative to the drive ratio can be made to approach the characteristic which is set in advance by making the amount of deformation of both the pulley halves uniform.

In addition, according to a second aspect of the invention, there is provided a belt-type continuously variable transmission as set forth in the first aspect of the invention, wherein the detection teeth are formed by machining grooves in the annular protruding portion.

According to the above construction, since the grooves can be machined in the annular protruding portion, the detection teeth can easily be formed through the simple machining in which the grooves are spot-faced.

Furthermore, according to a third aspect of the invention, there is provided a belt-type continuously variable transmission as set forth in the second aspect of the invention, wherein the grooves are each made to open in an outer circumferential surface and a side of the annular protruding portion and terminate at a position in the annular protruding portion just before the grooves reach an inner circumferential surface of the annular protruding portion.

According to the above construction, since the annular protruding portion is provided with the grooves which are each made to open toward the outer circumferential surface and the side of thereof and terminate at the position where the grooves do not reach the inner circumferential surface thereof, the annular protruding portion can be made to contribute effectively to the enhancement in rigidity of the fixed pulley half when compared with a case in which the grooves extend through the annular protruding portion from the outer circumferential surface to the inner circumferential surface of the annular protruding portion.

DETAILED DESCRIPTION OF THE PREFERRED EMBODIMENTS

A mode for carrying out the invention will be described below based on embodiments of the invention illustrated in the appended drawings.

Figure 1:
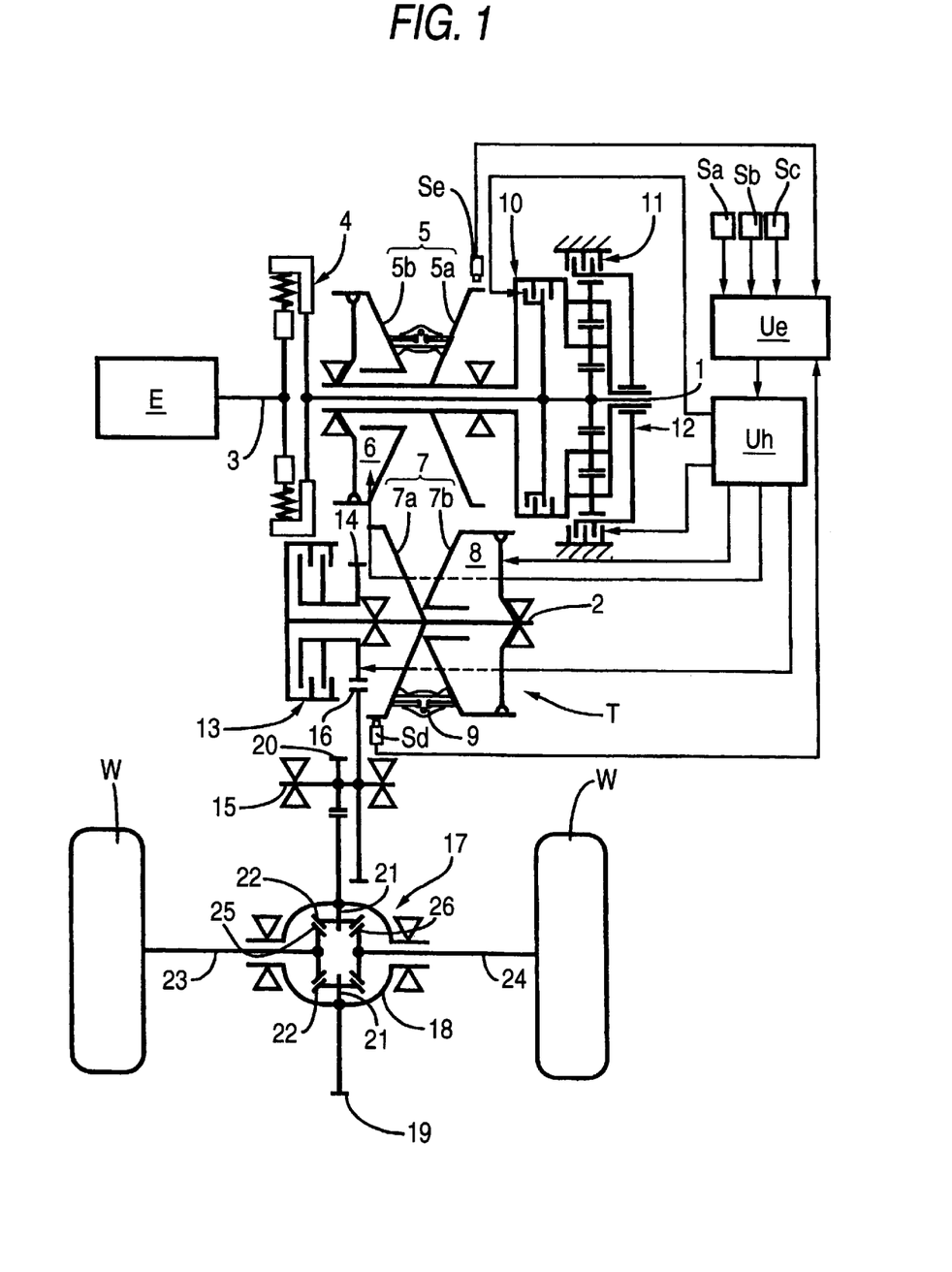
FIG. 1 is a diagram showing the overall construction of a belt-type continuously variable transmission.
Figure 2:
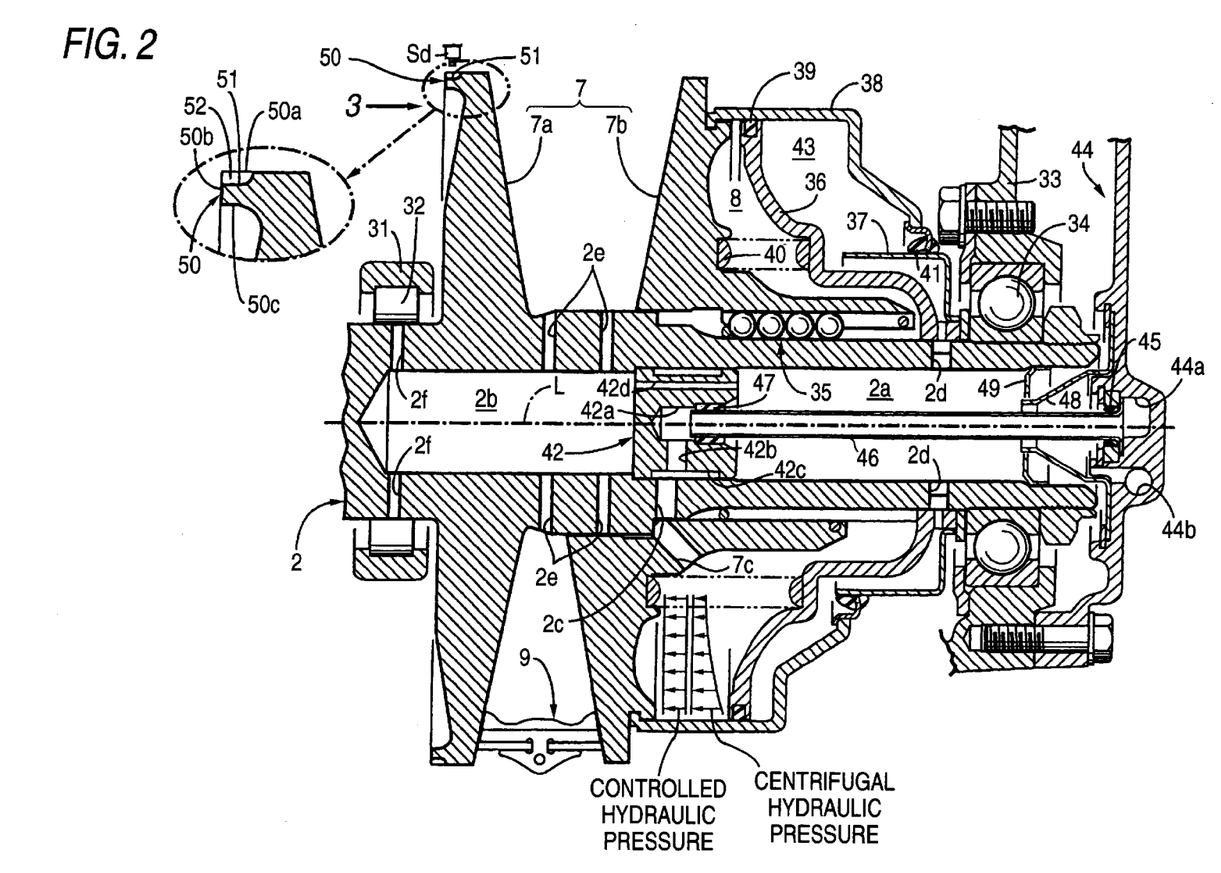
FIG. 2 is an enlarged view of a main portion of the belt-type continuously variable transmission shown in FIG. 1.
Figure 3:
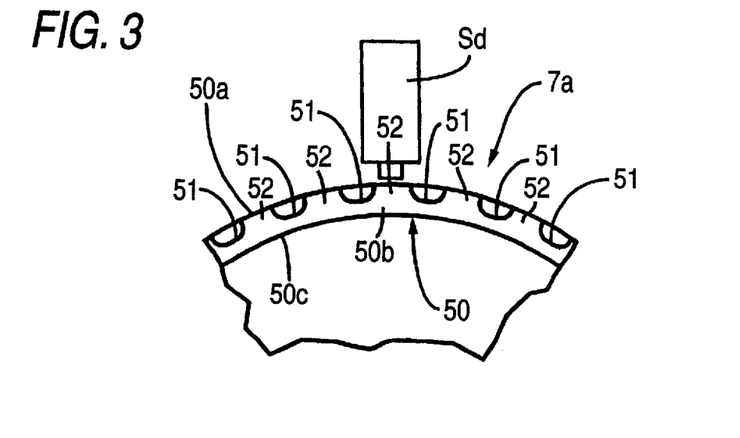
FIG. 3 is a view of a portion of the continuously variable transmission as seen in a direction indicated by an arrow 3 shown in FIG. 2.

FIGS. 1 to 3 show a first embodiment of the invention, in which FIG. 1 is a diagram showing the overall construction of a belt-type continuously variable transmission according to the first embodiment of the invention, FIG. 2 is an enlarged view showing a main portion of the belt-type continuously variable transmission shown in FIG. 1, and FIG. 3 is a view of a portion of the continuously variable transmission as seen in a direction indicated by an arrow 3 shown in FIG. 2.

As shown in FIG. 1, a belt-type continuously variable transmission T for an automotive vehicle includes an input shaft 1 and an output shaft 2 which are disposed in parallel. A right end of a crankshaft 3 of an engine E is connected to a left end of the input shaft 1 via a damper 4 with a flywheel.

A drive pulley 5 which is supported on the input shaft 1 includes a fixed pulley half 5a which can rotate relative to the input shaft 1 and a movable pulley half 5b adapted to slide in axial directions relative to the fixed pulley half 5a. The movable pulley half 5b is movable so as to vary a groove width that is formed between the fixed pulley half 5a and the movable pulley half 5b by virtue of a hydraulic pressure exerted to a hydraulic fluid chamber 6. A driven pulley 7 supported on the output shaft 2 includes a fixed pulley half 7a which is integrally formed on the output shaft 2 and a movable pulley half 7b adapted to slide in axial directions relative to the fixed pulley half 7a. The movable pulley half 7b is movable so as to vary a groove width formed between the fixed pulley half 7a and the movable pully half 7b by virtue of a hydraulic pressure exerted to a hydraulic fluid chamber 8. Then, a metal belt 9 made up of a number of segments which are held together by two elongate straps is wound around the drive pulley 5 and the driven pulley 7, and the belt is designed to be pushed.

A forward and reverse switching mechanism 12 is provided at a right end of the input shaft 1 that is made up of a planetary gear mechanism including a forward clutch 10 adapted to engage when a forward gear is established to transmit the rotation of the input shaft 1 to the drive pulley 5 in the forward direction and a reverse brake 11 adapted to engage when a reverse gear is established to transmit the rotation of the input shaft 1 to the drive pulley 5 in the reverse direction.

A first intermediate gear 14 is supported on the output shaft 2 in such a manner as to freely rotate relative to the output shaft 2. A starter clutch 13 provided at a left end of the output shaft 2 couples the first intermediate gear 14 to the output shaft 2. A second intermediate gear 16 adapted to mesh with the first intermediate gear 14 is provided on an intermediate shaft 15 disposed in parallel to the output shaft 2. A third intermediate gear 20 provided on the intermediate shaft 15 meshes with an input gear 19 provided in a gear box 18 in a differential gear 17. Side gears 25, 26 are provided at inboard distal ends of a left axle 23 and a right axle 24, respectively, which are supported in the gear box 18 in such a manner as to rotate relatively. The side gears 25, 26 mesh with a pair of pinions 22 supported via a pinion shaft 21 in the gear box 18. Drive wheels W, W are connected, respectively, to distal ends of the left axle 23 and the right axle 24.

Inputted to an electronic control unit Ue are signals from a throttle position sensor Sa, a vehicle speed sensor Sb and a reverse switch Sc for detecting the selection of a reverse range by a selector lever (not shown). The electronic control unit Ue outputs control signals to a hydraulic pressure control unit Uh based on signals from the respective sensors and the switch. Then, the hydraulic pressure control unit Uh then controls the groove width of the drive pulley 5 and the driven pulley 7 or the drive ratio of the continuously variable transmission, the engagement conditions of the forward clutch 10, the engagement conditions of the reverse brake 11 and the engagement conditions of the starter clutch 13.

Next, the construction of the driven pulley 7 will be described based on FIG. 2. In FIG. 2, an upper half portion and a lower half portion relative to an axis L of the output shaft 2 show a state in which the drive ratio for over drive is established and a state in which a LOW gear is established, respectively.

The output shaft 2 of the belt-type continuously variable transmission T is supported on a central casing 31 via a roller bearing 32 at an axially intermediate portion thereof and on a right casing 33 via a ball bearing 34 at a right end portion thereof. The fixed pulley half 7a of the driven pulley 7 is integrally formed on an outer circumference of the output shaft 2, and the movable pulley half 7b disposed to face a right-hand side surface of the fixed pulley half 7a is supported on the output shaft 2 via a ball spline 35 in such a manner as to freely slide in axial directions but not to rotate relatively to the output shaft 2. A piston member 36 is fixed to the outer circumference of the output shaft 2 in such a manner as to face a right-hand side surface of the movable pulley half 7b. Additionally, an inner cylinder member 37 is fixed to the outer circumference of the output shaft 2 in such a manner as to face a right-hand side surface of the piston member 36.

An outer cylinder member 38 is fixed to a right-hand side surface of an outer circumferential portion of the movable pulley half 7b. Further, a seal member 39 provided on an outer circumference of the piston member 36 is brought into slidable abutment with the outer cylinder member 38, so that the hydraulic fluid chamber 8 is defined between the movable pulley half 7b, the piston member 36, the outer cylinder member 38 and the output shaft 2. A spring 40 for biasing the movable pulley half 7b toward the fixed pulley half 7a is accommodated in the hydraulic fluid chamber 8 in a compressed state. In addition, a seal member 41 provided on an inner circumference of the outer cylinder member 38 is brought into slidable abutment with the inner cylinder member 37, so that a canceller fluid chamber 43 is defined between the piston member 36, the outer cylinder member 38, the inner cylinder member 37 and the output shaft 2.

Formed co-axially in the interior of the output shaft 2 along the axis L thereof are a first blind hole-like in-shaft fluid chamber 2a and a second blind hole-like in-shaft fluid chamber 2b which open at a right end face of the output shaft 2. A substantially cylindrical plug 42 is press fitted in the output shaft 2 in such a manner as to partition the first and second in-shaft fluid chambers 2a, 2b and is fixed at a position which abuts with a stepped portion of the output shaft 2. Two fluid paths 44a, 44b are formed in a right cover 44 connected to a right-hand side of the right casing 33, and a feed pipe 46 connected to the fluid path 44a via a seal member 45 at a right end thereof extends leftward in the interior of the first in-shaft fluid chamber 2a and fits at a left end thereof in a blind fluid hole 42a formed in the center of the plug 42 via a seal member 47.

The plug 42 includes a fluid hole 42b extending radially from the fluid hole 42a and an annular fluid groove 42c adapted to communicate with an outer end of the oil hole 42b. The annular groove 42c of the plug 42 communicates with the hydraulic fluid chamber 8 via a fluid hole 2c penetrating through the output shaft in a radial direction and a fluid hole 7c penetrating through a tubular portion of the movable pulley half 7b in a radial direction.

A funnel-like retainer 48 is fixed to the right cover 44 in such a manner as to surround an outer circumference of the feed pipe 46. Further, an annular retainer 49 is fixed within the first in-shaft fluid chamber 2a in the output shaft 2 in such a manner as to surround an outer circumference of an distal end of the retainer 48. The first in-shaft fluid chamber 2a communicates with the fluid path 44b in the right cover 44 via a gap between the outer circumference of the feed pipe 46 and the inner circumference of the retainer 48 and communicates with the outside of the output shaft 2 via a gap between the two retainers 48, 49. The first in-shaft fluid chamber 2a communicates with the canceller fluid chamber 43 via a fluid hole 2d penetrating through the output shaft 2 in a radial direction and also communicates with the second in-shaft fluid chamber 2b via an aperture 42d extending through the plug 42 in the axial direction. Fluid holes 2e extending in radial directions from the second in-shaft fluid chamber 2b confront the metal belt 9, and fluid holes 2f extending in radial directions confront the roller bearing 32.

As is clear when referring to FIGS. 2 and 3 together, an annular protruding portion 50 is formed integrally on a back surface (a surface opposite to the movable pulley half 7b) of an outer circumferential portion of the fixed pulley half 7a of the driven pulley 7. A number of detection teeth 52 are formed in the annular protruding portion 50 by forming a number of grooves 51 in the annular protruding portion 50 in radial directions. The grooves 51 are each made to open in an outer circumferential surface 50a and a side surface 50b of the annular protruding portion 50 and terminate at a position in the annular protruding portion 50 just before the grooves 51 reach an inner circumferential surface 50c of the annular protruding portion 50. Then, a detecting portion of the rotation sensor Sd comprising a magnetic pick-up confronts the outer circumferential surface 50a of the annular protruding portion 50 where the grooves 51 and detection teeth 52 are formed. Since the grooves 51 in the annular protruding portion 50 are machined through spot-facing, the machining of the grooves 51 is extremely easy.

Thus, when the fixed pulley half 7a of the driven pulley 7 rotates together with the output shaft 2, the detection teeth 52 passes the vicinity of the detecting portion of the rotation sensor Sd, whereby the number of revolutions of the output shaft 2 can be detected based on the frequency of a pulse signal outputted by the rotation sensor. Similarly, an annular protruding portion 50 having grooves 51 and detection teeth 52 which are identical in shape with that formed on the fixed pulley half 7a of the driven pulley 7 is also formed on a back surface of an outer circumferential portion of the fixed pulley half 5a of the drive pulley 5. And, a detecting portion of a rotation sensor Se (refer to FIG. 1) made up of a magnetic pick-up confronts an outer circumferential surface 50a of the annular protruding portion 50 where the grooves 51 and the detection teeth 52 are formed.

Next, the function of the embodiment provided with the construction that has been described heretofore will be described.

When a forward gear is selected by the selector lever, the forward clutch 10 is first brought into engagement by a command from the electronic control unit Ue, and as a result the input shaft 1 is integrally coupled with the drive pulley 5. Following this, the starter clutch 13 is brought into engagement and the torque of the engine E is transmitted to the drive wheels W, W via the input shaft 1, the drive pulley 5, and the metal belt 9, the driven pulley 7, the output shaft and the differential gear 17, whereby the vehicle starts to move forward. When the reverse gear is selected by the selector lever, the reverse brake 11 is brought into engagement by a command from the electronic control unit Ue, and then the drive pulley 5 is driven in a direction opposite to the rotational direction of the input shaft 1, whereby the vehicle starts to move in the reverse direction through engagement of the starter clutch 13.

When the vehicle starts to move as described above, the hydraulic pressure supplied to the hydraulic fluid chamber 6 in the drive pulley 5 by a command from the electronic control unit Ue increases, and the movable pulley half 5b of the drive pulley 5 moves closer to the fixed pulley half 5a thereof to thereby increase the effective radius of the drive pulley 5, whereas the hydraulic pressure supplied to the hydraulic fluid chamber 8 in the driven pulley 7 decreases, and the movable pulley half 7b of the driven pulley 7 moves apart from the fixed pulley half 7a thereof to thereby reduce the effective radius of the driven pulley 7, whereby the drive ratio of the belt-type continuously variable transmission T is continuously shifted from the LOW side to the OD (over drive) side.

Control oil or fluid supplied into the fluid path 44a in the right cover 44 flows through the interior of the feed pipe 46 accommodated in the first in-shaft fluid chamber 2a in the output shaft 2, flows into the fluid hole 42a in the plug 42, passes from the fluid hole 42a through the radial fluid hole 42b and the circumferential fluid groove 42c and is supplied into the hydraulic fluid chamber 8 via the fluid hole 2c of the output shaft 2 and the fluid hole 7c in the movable pulley half 7b of the driven pulley 7.

In addition, lubricating oil supplied into the fluid path 44b in the right cover 44 is supplied from the first in-shaft fluid chamber 2a in the output shaft 2 into the canceller fluid chamber 43 in the driven pulley 7 via the fluid holes 2d while flowing from the first in-shaft fluid chamber 2a into the second in-shaft fluid chamber 2b via the aperture 42d in the plug 42. The oil in the second in-shaft fluid chamber 2b flows out from the fluid holes 2e to lubricate the metal belt 9 which is wound around the driven pulley 7 while flowing out from the fluid holes 2f to lubricate the roller bearing 32 which supports the output shaft 2.

Incidentally, the outer cylinder member 38 is integrally coupled to the back surface of the movable pulley half 7b of the driven pulley 7, and both the controlled fluid pressure and the centrifugal fluid pressure are exerted to the fluid chamber 8 formed on the back surface of the movable pulley half 7b, whereby the rigidity of the movable pulley half 7b is increased by such an extent which acts to resist the axially outward deformation of the movable pulley half 7b. On the other hand, the annular protruding portion 50 provided on the back surface of the outer circumferential portion of the fixed pulley half 7a contributes to the enhancement in rigidity of the fixed pulley half 7a. In particular, since the grooves 51 in the annular protruding portion 50 only open in the outer circumferential surface 50a and the side surface 50b thereof but do not open in the inner circumferential surface 50c of the annular protruding portion 50, the rigidity increasing effect by the annular protruding portion 50 can be secured sufficiently. Thus, the extent to which the rigidity of the movable pulley half 7b is increased by the formation of the fluid chamber 8 is compensated for by the extent to which the rigidity of the fixed pulley half 7a is increased by the formation of the annular protruding portion 50. Accordingly, the difference in rigidity between both the pulley halves is reduced, thereby making it possible to make the variation characteristics of the misalignment relative to the drive ratio of the belt-type continuously variable transmission T approach the variation characteristic (the characteristics illustrated by the solid lines in FIG. 6) which are set in advance.

Thus, while the function of the driven pulley 7 has been described heretofore, the function of the drive pulley 5 is identical thereto.

Figure 4:
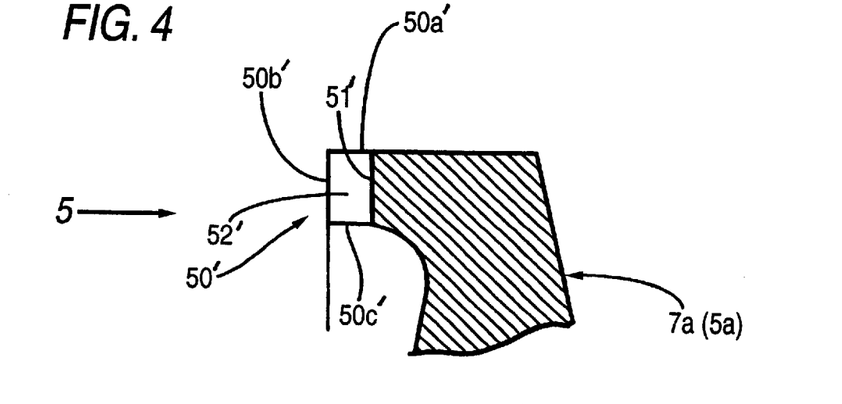
FIG. 4 is a longitudinally partially cross-sectional view of a fixed pulley half according to a second embodiment of the invention.
Figure 5:
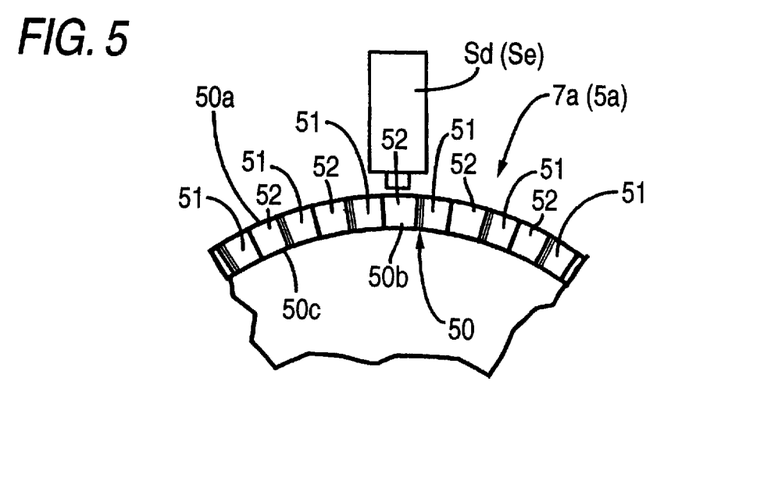
FIG. 5 is a view of the fixed pulley half as seen in a direction indicated by an arrow 5 in FIG. 4.

Next, a second embodiment of the invention will be described based on FIGS. 4 and 5.

In the second embodiment, grooves 51' which form the detection teeth 52' in the annular protruding portion 50' on either the drive pulley 5 or the driven pulley 7 open in the outer circumferential surface 50a', the side 50'b and the inner circumferential surface 50c' of the annular protruding portion 50'. According to the second embodiment, the rigidity of the annular protruding portion 50' decreases slightly when compared with the first embodiment in which the grooves 51' terminate at the position where they do not reach the inner circumferential surface 50c' of the annular protruding portion 50', but the grooves 51' can be machined more easily.

Thus, while the embodiments of the invention have been described in detail heretofore, the invention permits various modifications in design to be made thereto without departing from the spirit and scope thereof.

For example, while the detection teeth 52' are formed in both the fixed pulley halves 5a, 7a of the drive pulley 5 and the driven pulley 7 in the embodiments, the detection teeth 52' may be formed only in either of the fixed pulley halves 5a, 7a.

As has been described heretofore, according the first aspect of the invention, since the annular protruding portion is provided on the back of the outer circumferential portion of the fixed pulley half of either the drive pulley or the driven pulley of the belt-type continuously variable transmission and the detection teeth for the rotation detection sensor are formed in the annular protruding portion, the annular protruding portion can be made to contribute to the enhancement in rigidity of the fixed pulley half. Then, the difference in rigidity between the fixed pulley half and the movable pulley half whose rigidity is enhanced by the provision of the hydraulic fluid chamber can be reduced by the enhanced rigidity of the fixed pulley half, whereby the amount of deformation of both the pulley halves can be made uniform, thereby making it possible to allow the variation characteristics of the misalignment relative to the drive ratio to approach the characteristic set in advance.

According to the second aspect of the invention, since the detection teeth are formed by machining the grooves in the annular protruding portion, the detection teeth can easily be formed through a simple machining such as spot-facing the grooves therein.

According to the third aspect of the invention, since the annular protruding portion is provided with the grooves which open in the outer circumferential surface and the side of the annular protruding portion and terminate at the position in the annular protruding portion just before the grooves reach the inner circumferential surface of the annular protruding portion, the annular protruding portion can be made to effectively contribute to the enhancement of the rigidity of the fixed pulley half when compared with the case in which the grooves extend through the annular protruding portion from the outer circumferential surface to the inner circumferential surface thereof.

What is claimed is:

1. A belt-drive continuously variable transmission, comprising:
    a drive pulley supported on an input shaft and including a first fixed pulley half and a first movable pulley half adapted to move closer to and apart from said first fixed pulley half;
    a driven pulley supported on an output shaft and including a second fixed pulley half and a second movable pulley half adapted to move closer to and apart from said second fixed pulley half; and
    a metal belt wound around said drive pulley and said driven pulley,
    wherein said first and second fixed pulley halves and said first and second movable pulley halves are disposed at diagonal positions, respectively,
    wherein hydraulic fluid chambers are formed in said first and second movable pulley halves,
    wherein a number of detection teeth for a rotation sensor are formed in radial directions on a back surface of an outer circumferential portion of at least one of said first and second fixed pulley halves,
    wherein said detection teeth for said rotation sensor are formed in an annular protruding portion protruded on the back surface of the outer circumferential portion of said at least one of said first and second fixed pulley halves, and wherein grooves associated with said detection teeth are each made to open in an outer circumferential surface of said annular protruding portion and terminate at a position in said annular protruding portion just before said grooves reach an inner circumferential surface of said annular protruding portion.

2. The belt-drive continuously variable transmission as set forth in claim 1, wherein said detection teeth are formed by machining said grooves in said annular protruding portion.

3. The belt-drive continuously variable transmission as set forth in claim 1, wherein a back surface of said at least one of said first and second fixed pulley halves is recessed to define an inner circumferential surface of said annular protruding portion.

4. The belt-drive continuously variable transmission as set forth in claim 3, wherein said annular protruding portion includes a back surface flush with the back surface of said at least one of said first and second fixed pulley halves.

5. The belt-drive continuously variable transmission as set forth in claim 1, further comprising:

a cylinder member fixed to a back surface of said first movable pulley half to extend from the back surface thereof; and a piston member fixed to said input shaft to face with the back surface of said first movable pulley half, said cylinder member being axially slidable with respect to said piston member while contacting with a seal member disposed on an outer periphery of said piston member, wherein said hydraulic fluid chamber is defined by said first movable pulley half, said cylinder member, said piston member and said input shaft.

6. The belt-drive continuously variable transmission as set forth in claim 1, further comprising:

a cylinder member fixed to a back surface of said second movable pulley half to extend from the back surface thereof; and a piston member fixed to said output shaft to face with the back surface of said second movable pulley half, said cylinder member being axially slidable with respect to said piston member while contacting with a seal member disposed on an outer periphery of said piston member, wherein said hydraulic fluid chamber is defined by said second movable pulley half, said cylinder member, said piston member and said output shaft.

* * * * *